(12) United States Patent
Padovani et al.

(10) Patent No.: US 9,720,522 B2
(45) Date of Patent: Aug. 1, 2017

(54) DETERMINING RESPONSE TO CONTACT BY HAND WITH REGION OF TOUCHSCREEN

(71) Applicant: QUALCOMM Incorporated, San Diego, CA (US)

(72) Inventors: Niccolo Padovani, San Diego, CA (US); Gilad Bornstein, Haifa (IL); Nathan Altman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 14/642,553

(22) Filed: Mar. 9, 2015

(65) Prior Publication Data
US 2016/0266664 A1   Sep. 15, 2016

(51) Int. Cl.
*G06F 3/033* (2013.01)
*G06F 3/0354* (2013.01)
*G06F 3/041* (2006.01)
*G06F 3/043* (2006.01)

(52) U.S. Cl.
CPC .......... *G06F 3/03545* (2013.01); *G06F 3/043* (2013.01); *G06F 3/0416* (2013.01); *G06F 2203/04101* (2013.01); *G06F 2203/04104* (2013.01)

(58) Field of Classification Search
CPC ... G06F 3/0416; G06F 3/03545; G06F 3/0433
USPC .................................................. 345/173–179
See application file for complete search history.

(56) References Cited

U.S. PATENT DOCUMENTS

| | | |
|---|---|---|
| 4,991,148 A | 2/1991 | Gilchrist |
| 8,660,978 B2 | 2/2014 | Hinckley et al. |
| 2012/0154296 A1* | 6/2012 | Hinckley .............. G06F 3/0416 345/173 |
| 2012/0249489 A1* | 10/2012 | Onodera ............. G06F 3/03545 345/179 |
| 2012/0262407 A1 | 10/2012 | Hinckley et al. |
| 2012/0331546 A1 | 12/2012 | Falkenburg et al. |
| 2013/0016129 A1 | 1/2013 | Gossweiler, III et al. |
| 2013/0300696 A1 | 11/2013 | Haran et al. |

(Continued)

FOREIGN PATENT DOCUMENTS

EP   2662756 A1   11/2013

OTHER PUBLICATIONS

International Search Report and Written Opinion—PCT/US2016/018301—ISA/EPO—Jun. 2, 2016.

(Continued)

*Primary Examiner* — Calvin C Ma
(74) *Attorney, Agent, or Firm* — MG-IP Law, P.C.

(57) ABSTRACT

An apparatus that has a touchscreen, is configured to determine a response to a contact by a hand with a region of the touchscreen, and includes a first means for determining a location of a graphical projection of a digital pen onto the touchscreen, a second means for determining, via an ultrasonic wave, a first angle between a first line along an edge of the touchscreen and a second line along the graphical projection, a third means for determining a distance between the touchscreen and the digital pen, and a fourth means for determining, from the distance, the response to the contact by the hand with the region defined by the location and the first angle.

30 Claims, 4 Drawing Sheets

(56) References Cited

U.S. PATENT DOCUMENTS

2015/0062091 A1* 3/2015 Li .......................... G01S 5/186
 345/177

OTHER PUBLICATIONS

GoodNotes—Palm Rejection, Retrieved on Mar. 4, 2015, 2 pages, URL: http://www.goodnotesapp.com/user-guide/palm-rejection.html.

* cited by examiner

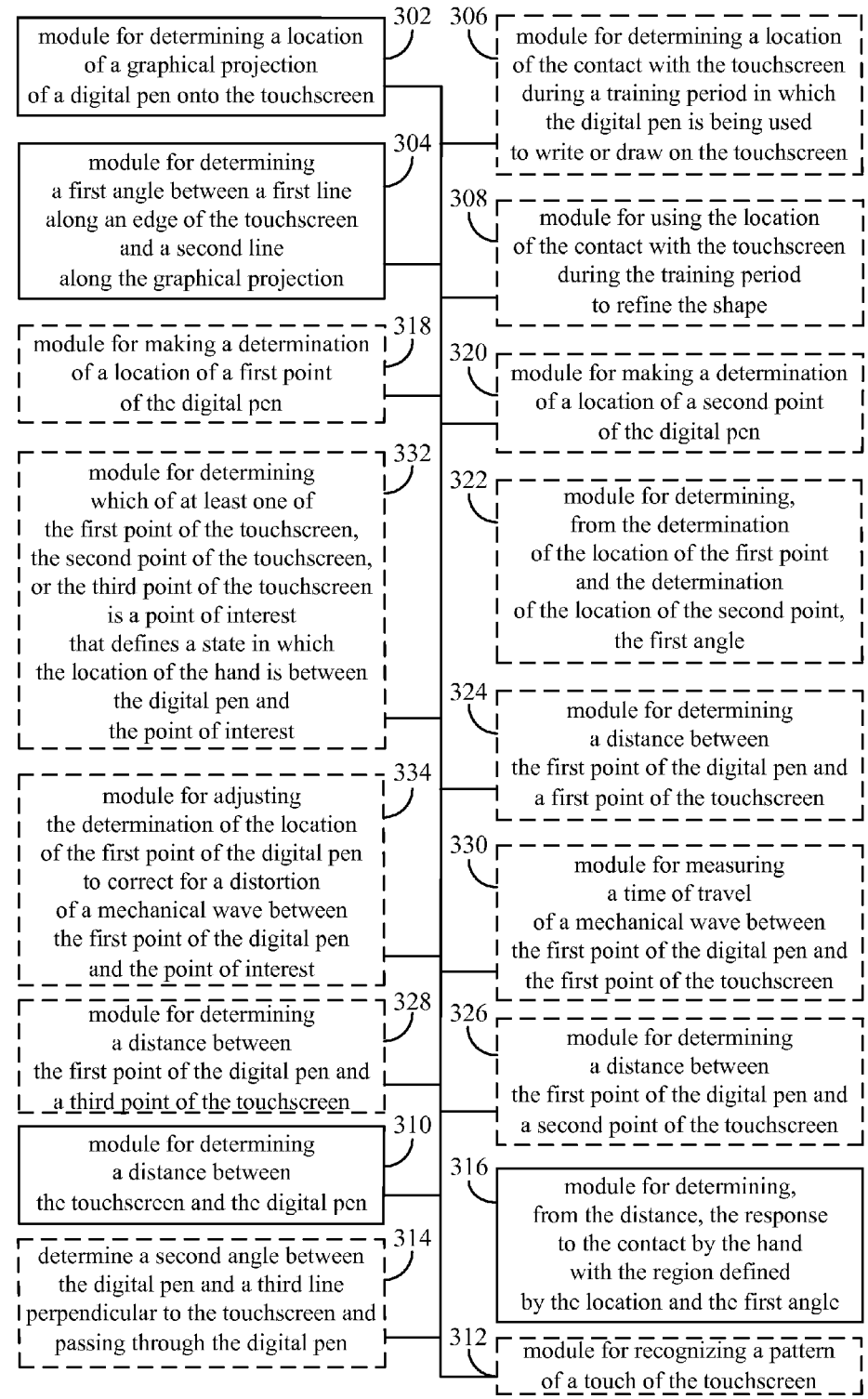

DETERMINING RESPONSE TO CONTACT BY HAND WITH REGION OF TOUCHSCREEN

BACKGROUND

Field

Aspects of this disclosure generally relate to determining a response to a contact by a hand with a region of a touchscreen.

Description of the Related Art

A touchscreen combines the functions of an electronic visual display and a user interface by allowing a user to interact directly with an object displayed on a screen rather than indirectly through a keyboard, a mouse, a touchpad, or other type of user interface. Accordingly, touchscreens have been incorporated into a wide variety of devices including game consoles, video games, interactive tables, personal computers, tablet computers, personal digital assistants, smartphones, mobile phones, satellite navigation devices, and electronic books. The interaction is realized in the form of a touch of the object displayed on the screen. In response to the touch, an electronic processor of the device that has the touchscreen causes the device to perform an action in a manner associated with the object, the type of the touch, or both. Such actions include causing application programs to start or stop, causing information to be input to the device, and/or changing appearances of displayed objects.

Originally, a stylus or digital pen was used to interact with a touchscreen to protect the touchscreen from oil residue that might otherwise obscure the touchscreen if a finger is used for the interaction. However, more recently developed touchscreens not only include technology that lessens the impact of oil residue, but also are designed to support a variety of multi-touch gestures to increase the functionality that can be realized from using a touchscreen as a user interface. Such multi-touch gestures are characterized by the size of the area of contact with the displayed object, the duration of time of contact with the displayed object, the number of points of contact with the displayed object, and/or the direction(s) of movement along the screen. Among the multi-touch gestures that can be applied to a displayed object and recognized by current touchscreens are a tap (with one or two fingers), a double tap, a long press, a scroll (with one or two fingers), a pan, a flick, a pinch, a zoom (outward moving pinch), and a rotate. Despite these developments, a stylus or digital pen is often still used to interact with a touchscreen to facilitate a more precise indication of a point of a touch, particularly when the interaction involves writing or drawing.

Unfortunately, the increase in the variety of touch gestures complicates efforts to distinguish an intended touch of a touchscreen from unintended contact with the touchscreen.

There have been efforts to address this problem. One approach has been to incorporate a mechanism to designate a portion of a touchscreen to be unresponsive to touches. The mechanism is initiated by a selection by the user.

Another approach has been to incorporate a rejection algorithm into a device that has a touchscreen. The basis of the algorithm is an assumption that both a digital pen and a portion of a hand will rest on a touchscreen when a user is writing on the touchscreen. The algorithm is designed to try to distinguish the location of the touch of the digital pen from the location of the touch of the portion of the hand. The algorithm is initiated by a selection by the user. The selection is typically made when the user intends to write on the touchscreen with a digital pen. The algorithm is designed to try to ignore other touches of the touchscreen when the algorithm has been initiated by the user.

In a variation of this approach, the algorithm is designed to consider several factors to distinguish intentional from unintentional touches of the touchscreen. These factors include a number of points of touch on the touchscreen, whether the touches are sequential or concurrent, shapes of the points of touch, whether the shapes of the points of touch coincide with concurrent touches by a finger and a digital pen, a distance between the touchscreen and the digital pen, an angle between the touchscreen and the digital pen, an analysis of a grip position of the digital pen, and an analysis of a grip of a device that has the touchscreen.

SUMMARY

Features and utilities of aspects disclosed herein can be achieved by providing a method for determining a response to a contact by a hand with a region of a touchscreen. A location of a graphical projection of a digital pen onto the touchscreen can be determined. A first angle between a first line along an edge of the touchscreen and a second line along the graphical projection can be determined via an ultrasonic wave. A distance between the touchscreen and the digital pen can be determined. From the distance, the response to the contact by the hand with the region defined by the location and the first angle can be determined.

Features and utilities of aspects disclosed herein can also be achieved by providing an apparatus that has a touchscreen and is configured to determine a response to a contact by a hand with a region of the touchscreen. The apparatus can include a first circuit, a second circuit, a third circuit, and a fourth circuit. The first circuit can be configured to determine a location of a graphical projection of a digital pen onto the touchscreen. The second circuit can be configured to determine, via an ultrasonic wave, a first angle between a first line along an edge of the touchscreen and a second line along the graphical projection. The third circuit can be configured to determine a distance between the touchscreen and the digital pen. The fourth circuit can be configured to determine, from the distance, the response to the contact by the hand with the region defined by the location and the first angle.

Features and utilities of aspects disclosed herein can also be achieved by providing a non-transitory computer-readable recording medium for determining a response to a contact by a hand with a region of a touchscreen. At least one instruction can determine a location of a graphical projection of a digital pen onto the touchscreen. At least one instruction can determine, via an ultrasonic wave, a first angle between a first line along an edge of the touchscreen and a second line along the graphical projection. At least one instruction can determine a distance between the touchscreen and the digital pen. At least one instruction can determine, from the distance, the response to the contact by the hand with the region defined by the location and the first angle.

Features and utilities of aspects disclosed herein can also be achieved by providing an apparatus that has a touchscreen and is configured to determine a response to a contact by a hand with a region of the touchscreen. The apparatus can include means for determining a location of a graphical projection of a digital pen onto the touchscreen. The apparatus can include means for determining, via an ultrasonic wave, a first angle between a first line along an edge of the touchscreen and a second line along the graphical projection. The apparatus can include means for determining a distance between the touchscreen and the digital pen. The apparatus can include means for determining, from the distance, the response to the contact by the hand with the region defined by the location and the first angle.

BRIEF DESCRIPTION OF THE DRAWINGS

These and other sample aspects of the disclosure are described in the detailed description and the claims that follow, and in the accompanying drawings.

FIG. 3 is a simplified block diagram of several sample aspects of an apparatus configured to determine a response to a contact by a hand with a region of a touchscreen, according to the disclosure.

Figure 1:
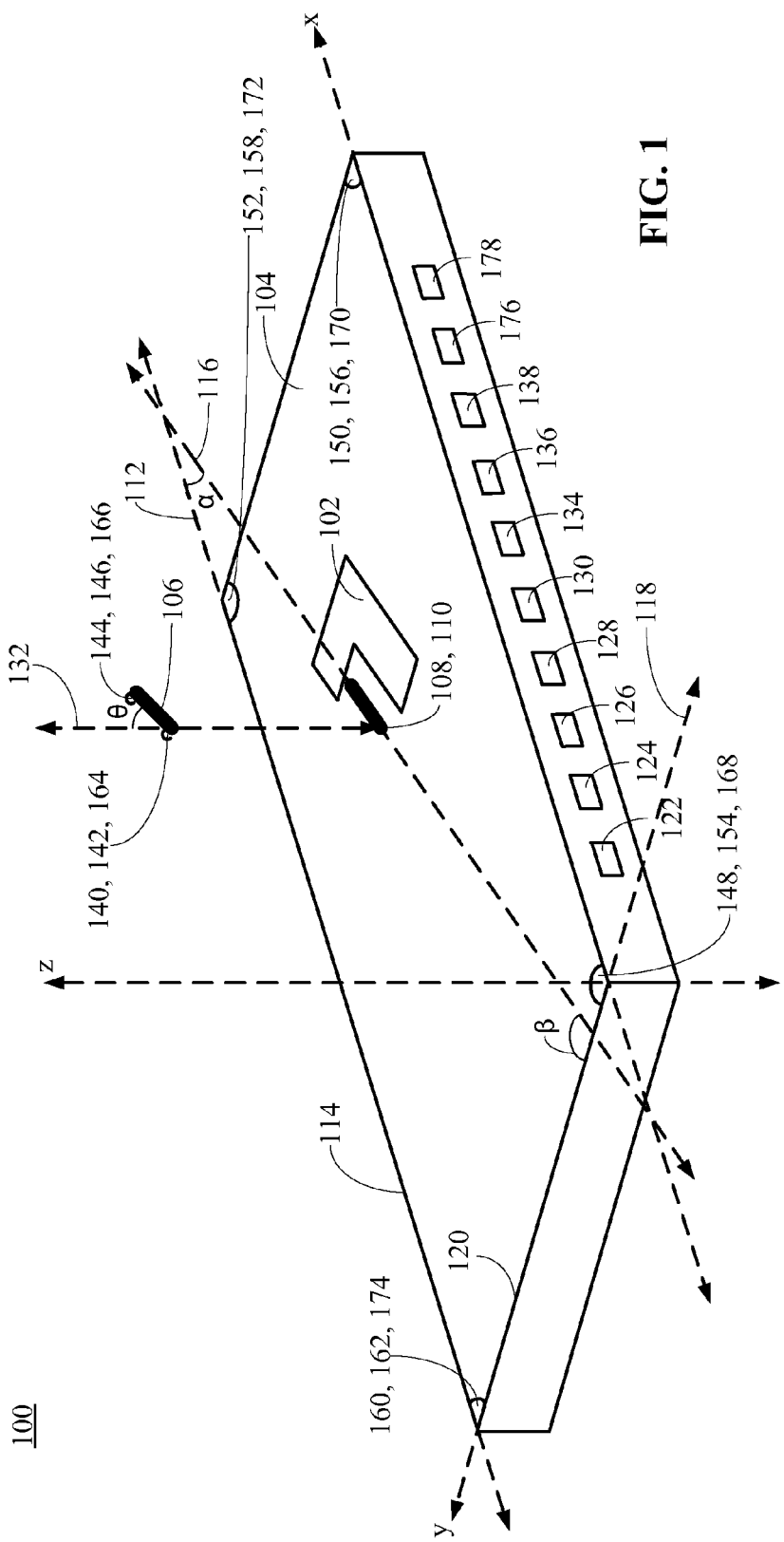
FIG. 1 is a diagram of an example of an apparatus configured to determine a response to a contact by a hand with a region of a touchscreen, according to the disclosure.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Figure 2A:
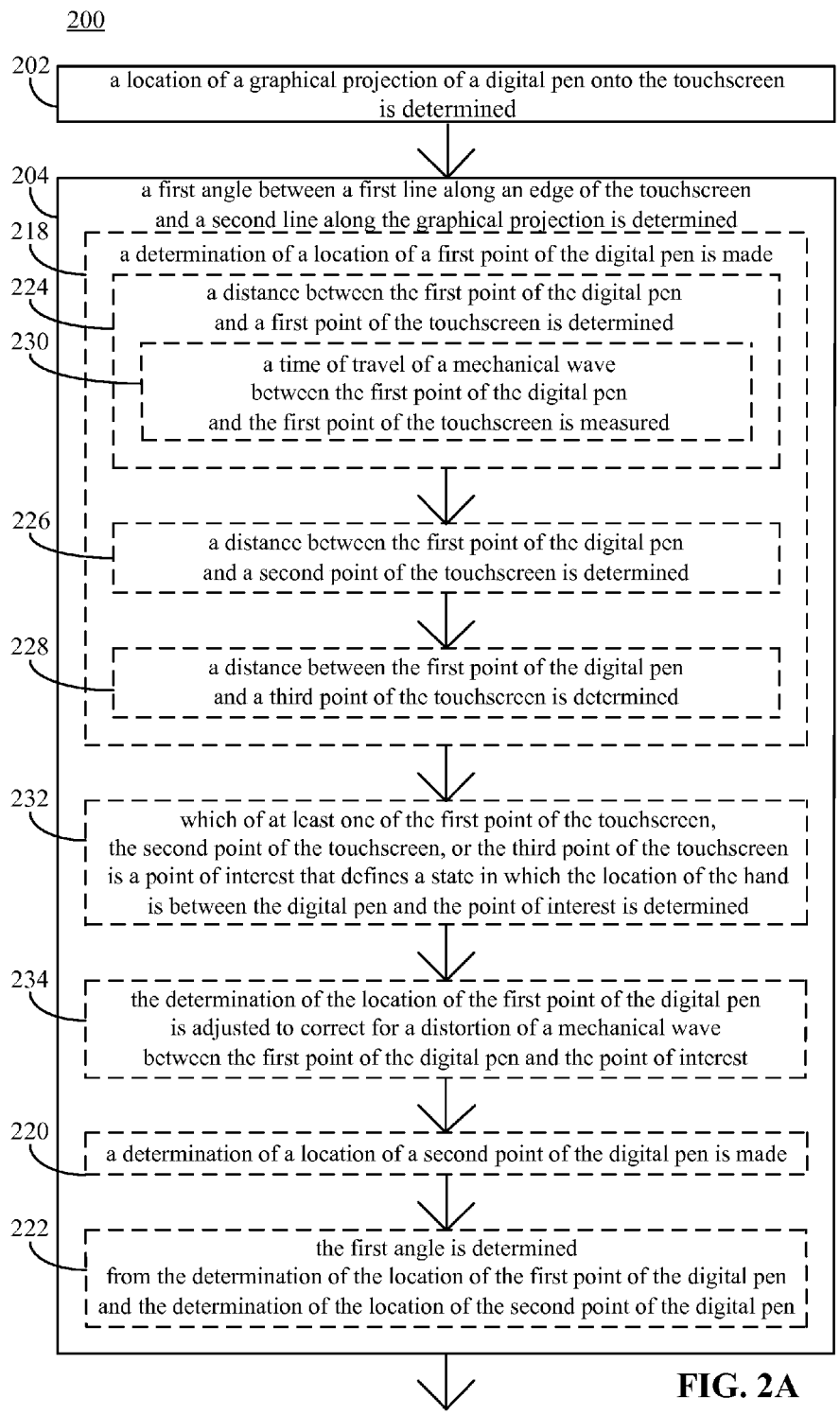
FIGS. 2A and 2B are a flowchart of an example of a method for determining a response to a contact by a hand with a region of a touchscreen, according to the disclosure.
Figure 2B:
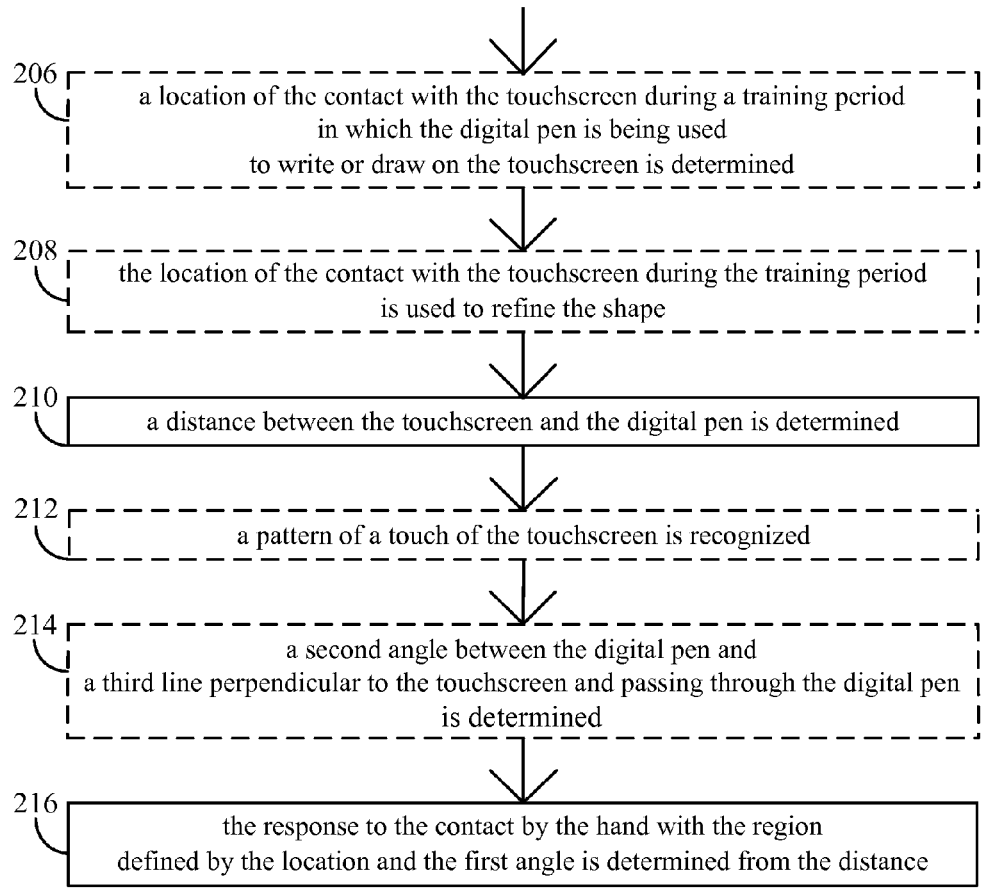

Aspects of this disclosure generally relate to determining a response to a contact by a hand with a region of a touchscreen. FIG. 1 is a diagram of an example of an apparatus 100 configured to determine a response to a contact by a hand with a region 102 of a touchscreen 104, according to the disclosure. FIGS. 2A and 2B are a flowchart of an example of a method 200 for determining a response to a contact by a hand with the region 102 of the touchscreen 104, according to the disclosure. In FIGS. 2A and 2B, optional operations of the method 200 are illustrated in dashed blocks. FIG. 3 is a simplified block diagram of several sample aspects of an apparatus 300 configured to determine a response to a contact by a hand with the region 102 of the touchscreen 104, according to the disclosure. In some aspects one or more of any dashed blocks in FIG. 3 are optional.

The apparatus 100 can be any device configured to include the touchscreen 104 including, but not limited to, a game console, a video game, an interactive table, a personal computer, a tablet computer, a personal digital assistant, a smartphone, a mobile phone, a satellite navigation device, a point of sale device, an electronic book, or the like.

The touchscreen 104 can be, but is not limited to, a resistive touchscreen, a capacitive touchscreen (including a surface capacitive touchscreen, a projected capacitance touchscreen, a mutual capacitance touchscreen, and a self-capacitance touchscreen), a surface acoustic wave touchscreen, an acoustic pulse recognition touchscreen, a piezoelectric touchscreen, an infrared grid touchscreen, an infrared acrylic projection touchscreen, an optical imaging touchscreen, any combination of the foregoing, or the like.

The touchscreen 104 can combine the functions of an electronic visual display and a user interface by allowing a user to interact directly with an object displayed on a screen rather than indirectly through a keyboard, a mouse, a touchpad, or other type of user interface. The interaction can be realized in the form of a touch of the object displayed on the touchscreen 104. In response to the touch, at least one circuit of the apparatus 100 can cause the apparatus 100 to perform an action in a manner associated with the object, the type of the touch, or both. Such interactions can include, but are not limited to, causing application programs to start or stop, causing information to be input to the apparatus 100, changing appearances of displayed objects, any combination of the foregoing, or the like. Interactions with the touchscreen 104 can be realized using a stylus, a digital pen 106, one or more fingers, any combination of the foregoing, or the like. Use of a stylus or the digital pen 106 can be used to facilitate a more precise indication of a point of a touch, particularly when the interaction involves writing, drawing, or both.

The interactions with the touchscreen 104 can include multi-touch gestures. Such multi-touch gestures can be characterized, for example, by the size of the area of contact with the displayed object, the duration of time of contact with the displayed object, the number of points of contact with the displayed object, the direction(s) of movement along the screen, any combination of the foregoing, or the like. The multi-touch gestures can include, but are not limited to, a tap (with one or more fingers), a double tap, a long press, a scroll (with one or more fingers), a pan, a flick, a pinch, a zoom (outward moving pinch), a rotate, any combination of the foregoing, or the like.

The digital pen 106 can be distinguished from a stylus in that the digital pen 106, unlike a stylus, can include at least one of an energy transmitter or an energy receiver/sensor configured to interact with a counterpart at least one of an energy receiver/sensor or an energy transmitter included with the apparatus 100. Optionally, the digital pen can include, for example, an internal circuit, memory, touch sensors, input buttons, writing data transmission technology, electronic erasers, any combination of the foregoing, or the like.

Unfortunately, the variety of touch gestures can complicate efforts to distinguish an intended touch of the touchscreen 104 from unintended contact with the touchscreen 104. Particularly, this can be the case when a user holds a stylus or the digital pen 106 and interacts with the touchscreen 104 using the stylus, the digital pen 106, one or more fingers, any combination of the foregoing, or the like. For example, when the user holds the stylus or the digital pen 106 in a hand to write or draw on the touchscreen 104, a portion of a hand that faces the touchscreen 104 can unintentionally contact the touchscreen 104. In light of the variety of touch gestures intended to be recognized as inputs from the user, such an unintended contact between the portion of the hand and the touchscreen 104 can erroneously be recognized as such an input.

The apparatus 100 described herein, along with the associated method 200 (and associated computer program products and other equivalents), can improve a recognition rate of an unintended contact between a portion of the hand and the touchscreen 104, can reduce false positive conclusions in which a contact between the portion of the hand and the touchscreen 104 is determined to be unintentional when in reality the contact is intentional, and can reduce false negative conclusions in which a contact between the portion of the hand and the touchscreen 104 is determined to be intentional when in reality the contact is unintentional. In an aspect, the apparatus 100 can be configured likely to prevent an unintended contact between a portion of the hand and the touchscreen 104 from being erroneously recognized as an intended touch of the touchscreen 104. In an aspect, the apparatus 100 can be configured likely to recognize an intended touch of the touchscreen 104 by one or more fingers or the like, even when a user holds the digital pen 106 while performing the intended touch, by determining a location and a shape of the region 102 that corresponds to the portion of the hand that faces the touchscreen 104 when the hand holds the digital pen 106 to write or draw on the touchscreen 104 and by determining a distance between the digital pen 106 and the touchscreen 104. In an aspect, in response to a determination of the location and the shape of the region 102, the apparatus 100 can be configured to cause the region 102 to be unresponsive to touches. In another aspect, in response to the determination of the location and the shape of the region 102, the apparatus 100 can be configured to assign a higher weight to touches within the region 102 as compared with other regions of the touchscreen, but also be configured to consider other factors to determine if there should be a response to a touch in the region 102.

To facilitate an understanding of the apparatus 100, a three-dimensional set of axes, an x-axis, a y-axis, and a z-axis, each axis perpendicular to each other axis, is included in the illustration depicted in FIG. 1.

With reference to FIGS. 1, 2A, and 2B, at an operation 202, a location 108 of a graphical projection 110 of the digital pen 106 can be determined. At an operation 204, a first angle α between a first line 112 along an edge 114 of the touchscreen 104 and a second line 116 along the graphical projection 110 can be determined. (Alternatively, a first angle β between a first line 118 along an edge 120 of the touchscreen and the second line 116 along the graphical projection 110 can be determined.) The first angle α (or β) can define a location of a hand that holds the digital pen 106. For example, the first angle α (or β) being in the range from 0 to 45 degrees (or from 45 to 90 degrees) can be associated with a "normal" grip of the digital pen 106, while the first angle α (or β) being in the range from 45 to 90 degrees (or from 0 to 45 degrees) can be associated with a "claw" style grip of the digital pen 106. For example, the "claw" style grip can be associated with a grip of the digital pen 106 that is located at a higher value y-axis coordinate than the "normal" grip. In turn, the region 102 can be defined by the location 108 and the first angle α (or β). For example, based on biomechanics of the hand when holding the digital pen 106, the region 102 can be within 30 to 45 degrees (or 45 to 60 degrees) of the first angle α (or β). The region 102 can have a shape that substantially approximates a profile of a portion of the hand that faces the touchscreen 104 when the hand is holding the digital pen 106 to write, draw, or both on the touchscreen 104. For example, the region 102 can have an L-shape when the region 102 is associated with the "normal" grip, and the region 102 can have a more horizontal shape (as defined, for example, by the x-axis) when the region 102 is associated with the "claw" style grip.

By way of example and not by way of limitation, a first circuit 122 can be configured to determine the location 108 of the graphical projection 110 of the digital pen 106 onto the touchscreen 104. A second circuit 124 can be configured to determine the first angle α (or β) between the first line 112 (or 118) along the edge 114 (or 120) of the touchscreen 104 and the second line 116 along the graphical projection 110.

The first circuit 122 and the second circuit 124 are depicted along a side of the apparatus 100 for ease of illustration. One of skill in the art understands that the first circuit 122, the second circuit 124, or both can be disposed within the apparatus 100. One of skill in the art also understands that at least one of the first circuit 122 or the second circuit 124 can be a common circuit with at least one other of the first circuit 122 or the second circuit 124. For example, such a common circuit can be an electronic processor.

By way of another example and not by way of limitation, one of skill in the art understands that a non-transitory computer-readable recording medium can include at least one instruction to perform the operations 202 and 204.

Optionally, at an operation 206, a location of the contact with the touchscreen 104 during a training period can be determined. The digital pen 106 can be used to write, draw, or both on the touchscreen 104 during the training period. Optionally, at an operation 208, the location of the contact with the touchscreen 104 during the training period can be used to refine the shape of the region 102.

By way of example and not by way of limitation, an optional third circuit 126 can be configured to determine the location of the contact with the touchscreen 104 during a training period. The digital pen 106 can be used to write, draw, or both on the touchscreen 104 during the training period. An optional fourth circuit 128 can be configured to use the location of the contact with touchscreen 104 during the training period to refine the shape of the region 102.

The third circuit 126 and the fourth circuit 128 are depicted along the side of the apparatus 100 for ease of illustration. One of skill in the art understands that the third circuit 126, the fourth circuit 128, or both can be disposed within the apparatus 100. One of skill in the art also understands that at least one of the first circuit 122, the second circuit 124, the third circuit 126, or the fourth circuit 128 can be a common circuit with at least one other of the first circuit 122, the second circuit 124, the third circuit 126, or the fourth circuit 128. For example, such a common circuit can be an electronic processor.

By way of another example and not by way of limitation, one of skill in the art understands that a non-transitory computer-readable recording medium can include at least one instruction to perform the operations 206 and 208.

At an operation 210, a distance between the touchscreen 104 and the digital pen 106 can be determined. By way of example and not by way of limitation, a fifth circuit 130 can be configured to determine the distance between the touchscreen 104 and the digital pen 106. The fifth circuit 130 is depicted along the side of the apparatus 100 for ease of illustration. One of skill in the art understands that the fifth circuit 130 can be disposed within the apparatus 100. One of skill in the art also understands that at least one of the first circuit 122, the second circuit 124, the third circuit 126, the fourth circuit 128, or the fifth circuit 130 can be a common circuit with at least one other of the first circuit 122, the second circuit 124, the third circuit 126, the fourth circuit 128, or the fifth circuit 130. For example, such a common circuit can be an electronic processor. By way of another example and not by way of limitation, one of skill in the art understands that a non-transitory computer-readable recording medium can include at least one instruction to perform the operation 210.

Optionally, at an operation 212, a pattern of a touch of the touchscreen 104 can be recognized. For example, the pattern of the touch can be, but is not limited to, a multi-touch gesture. Optionally, at an operation 214, a second angle θ between the digital pen 106 and a third line 132 perpendicular to the touchscreen 104 and passing through the digital pen 106 can be determined. The second angle θ can determine, for example, if the digital pen 106 is being held by the hand to perform an intentional touch, being held by the hand to write, draw, or both, or being held by the hand in an idle position (e.g., not to perform an intentional touch or to write or to draw).

By way of example and not by way of limitation, an optional sixth circuit 134 can be configured to recognize the pattern of the touch of the touchscreen 104. An optional seventh circuit 136 can be configured to determine the second angle θ between the digital pen 106 and the third line 132 perpendicular to the touchscreen 104.

The sixth circuit 134 and the seventh circuit 136 are depicted along the side of the apparatus 100 for ease of illustration. One of skill in the art understands that the sixth circuit 134, the seventh circuit 136, or both can be disposed within the apparatus 100. One of skill in the art also understands that at least one of the first circuit 122, the second circuit 124, the third circuit 126, the fourth circuit 128, the fifth circuit 130, the sixth circuit 134, or the seventh circuit 136 can be a common circuit with at least one other of the first circuit 122, the second circuit 124, the third circuit 126, the fourth circuit 128, the fifth circuit 130, the sixth circuit 134, or the seventh circuit 136. For example, such a common circuit can be an electronic processor.

By way of another example and not by way of limitation, one of skill in the art understands that a non-transitory computer-readable recording medium can include at least one instruction to perform the operations 212 and 214.

At an operation 216, the response to the contact by the hand with the region 102 can be determined from the distance. The region 102 can be defined by the location 108 and the first angle α (or β). By way of example and not by way of limitation, an eighth circuit 138 can be configured to determine, from the distance, the response to the contact by the hand with the region 102 defined by the location 108 and the first angle α (or β). The eighth circuit 138 is depicted along the side of the apparatus 100 for ease of illustration. One of skill in the art understands that the eighth circuit 138 can be disposed within the apparatus 100. One of skill in the art also understands that at least one of the first circuit 122, the second circuit 124, the third circuit 126, the fourth circuit 128, the fifth circuit 130, the sixth circuit 134, the seventh circuit 136, or the eighth circuit 138 can be a common circuit with at least one other of the first circuit 122, the second circuit 124, the third circuit 126, the fourth circuit 128, the fifth circuit 130, the sixth circuit 134, the seventh circuit 136, or the eighth circuit 138. For example, such a common circuit can be an electronic processor. By way of another example and not by way of limitation, one of skill in the art understands that a non-transitory computer-readable recording medium can include at least one instruction to perform the operation 216.

In an aspect, the operation 216 (determining the response to the contact by the hand with the region 102 from the distance) can include an operation 218. At the operation 218, if the distance is greater than a threshold, the response can be an action by the apparatus 100 (e.g., causing an application program to start or stop, causing information to be input to the apparatus 100, changing an appearance of displayed objects, etc.). In other words, if the distance is greater than the threshold, the method 200 can recognize a contact in the region 102 as an intentional touch because the digital pen 106 is sufficiently far away from the touchscreen 104 that it is unlikely that the user intends to use the digital pen 106 to interact with the touchscreen 104. By way of example and not by way of limitation, the eighth circuit 138 can be configured to determine if the distance is greater than the threshold. If the distance is greater than the threshold, then the response can be an action by the apparatus 100 (e.g., causing an application program to start or stop, causing information to be input to the apparatus 100, changing an appearance of displayed objects, etc.). By way of another example and not by way of limitation, one of skill in the art understands that a non-transitory computer-readable recording medium can include at least one instruction to perform the operation 218.

In an aspect, the operation 216 (determining the response to the contact by the hand with the region 102 from the distance) can include an operation 220. At the operation 220, if the distance is less than a threshold, the response can be a prevention of an action by the apparatus 100. In other words, if the distance is less than the threshold, the method 200 can recognize a contact in the region 102 as an unintentional contact because the digital pen 106 is sufficiently near to the touchscreen 104 that it is likely that the user intends to use the digital pen 106 to interact with the touchscreen 104 and that contact in the region 102 is likely to be unintentional contact by a portion of the hand that faces the touchscreen 104. By way of example and not by way of limitation, the eighth circuit 138 can be configured to determine if the distance is less than the threshold. If the distance is less than the threshold, then the response can be a prevention of an action by the apparatus 100. By way of another example and not by way of limitation, one of skill in the art understands that a non-transitory computer-readable recording medium can include at least one instruction to perform the operation 220.

In an aspect, the operation 216 (determining the response to the contact by the hand with the region 102 from the distance) can include an operation 222. At the operation 222, the response to the contact by the hand with the region 102 defined by the location 108 and the first angle α (or β) can be determined from the distance, the pattern of the touch of the touchscreen 104 (e.g., a multi-touch gesture), and the second angle θ. By way of example and not by way of limitation, the eighth circuit 138 can be configured to determine, from the distance, the pattern of the touch of the touchscreen 104 (e.g., a multi-touch gesture), and the second angle θ, the response to the contact by the hand with the region 102 defined by the location 108 and the first angle α(or β). By way of another example and not by way of limitation, one of skill in the art understands that a non-transitory computer-readable recording medium can include at least one instruction to perform the operation 222.

In an aspect, the operation 222 (determining the response to the contact by the hand with the region 102 from the distance, the pattern of the touch of the touchscreen 104, and the second angle θ) can include an operation 224. At the operation 224, if the second angle θ is greater than a threshold, the response can be a prevention of an action by the apparatus 100. In other words, if the second angle θ is greater than the threshold, the method 200 can recognize the digital pen 106 is being held by the hand in an idle position, rather than to perform an intentional touch or to write or to draw, and that contact in the region 102 is likely to be unintentional contact by a portion of the hand that faces the touchscreen 104. By way of example and not by way of limitation, the eighth circuit 138 can be configured to determine if the second angle θ is greater than the threshold. If the second angle θ is greater than the threshold, then the response can be a prevention of an action by the apparatus 100. By way of another example and not by way of limitation, one of skill in the art understands that a non-transitory computer-readable recording medium can include at least one instruction to perform the operation 224.

In an aspect, the operation 204 (determining the first angle α(or β) between the first line 112 (or 118) along the edge 114 (or 120) of the touchscreen 104 and the second line 116 along the graphical projection 110) can include an operation 218, an operation 220, and an operation 222. At the operation 218, a determination of a location of a first point 140 of the digital pen 106 can be made. Preferably, but not necessarily, the location of the first point 140 of the digital pen 106 can be at or near a first end 142 of the digital pen 106. For example, the location of the first point 140 of the digital pen 106 can be 20 units along the x-axis, 10 units along the y-axis, and 5 units along the z-axis. At the operation 220, a determination of a location of a second point 144 of the digital pen 106 can be made. Preferably, but not necessarily, the location of the second point 144 of the digital pen 106 can be at or near a second end 146 of the digital pen 106. For example, the location of the second point 144 of the digital pen 106 can be 29 units along the x-axis, 22 units along the y-axis, and 25 units along the z-axis. At the operation 222, the first angle α(or β) can be determined from the location of the first point 140 of the digital pen 106 and the location of the second point 144 of the digital pen 106. For example, one of skill in the art understands that values of the z-axis coordinates of the first and second points 140 and 144 of the digital pen 106 can be disregarded, a difference between a value of the y-axis coordinate of the first point 140 of the digital pen 106 (10) subtracted from a value of the y-axis coordinate of the second point 144 of the digital pen 106 (22) is 12 units, a difference between a value of the x-axis coordinate of the first point 140 of the digital pen 106 (20) subtracted from a value of the x-axis coordinate of the second point 144 of the digital pen 106 (29) is 9 units, and from the differences in the values (12 units along the y-axis and 9 units along the x-axis), the first angle α(or β) can be determined to be 30 degrees (or 60 degrees).

By way of example and not by way of limitation, the second circuit 124 can be configured to make the determination of the location of the first point 140 of the digital pen 106, to make the determination of the location of the second point 144 of the digital pen 106, and to determine, from the determination of the location of the first point 140 and the determination of the location of the second point 144, the first angle α(or β).

By way of another example and not by way of limitation, one of skill in the art understands that a non-transitory computer-readable recording medium can include at least one instruction to perform the operations 218, 220, and 222.

In an aspect, the operation 218 (making the determination of the location of the first point 140 of the digital pen 106) can include an operation 224, an operation 226, and an operation 228. At the operation 224, a distance between the first point 140 of the digital pen 106 and a first point 148 of the touchscreen 104 can be determined. The distance between the first point 140 of the digital pen 106 and the first point 148 of the touchscreen 104 can define a first sphere (not illustrated) centered at the first point 148 of the touchscreen 104. Based upon the distance between the first point 140 of the digital pen 106 and the first point 148 of the touchscreen 104, the first point 140 of the digital pen 106 can be located at any point on a circumference of the first sphere. At the operation 226, a distance between the first point 140 of the digital pen 106 and a second point 150 of the touchscreen 104 can be determined. The distance between the first point 140 of the digital pen 106 and the second point 150 of the touchscreen 104 can define a second sphere (not illustrated) centered at the second point 150 of the touchscreen 104. Based upon the distance between the first point 140 of the digital pen 106 and the first point 148 of the touchscreen 104 and the distance between the first point 140 of the digital pen 106 and the second point 150 of the touchscreen 104, the first point 140 of the digital pen 106 can be located at any point on a closed curve that defines an intersection of the first sphere and the second sphere. At the operation 228, a distance between the first point 140 of the digital pen 106 and a third point 152 of the touchscreen 104 can be determined. The distance between the first point 140 of the digital pen 106 and the third point 152 of the touchscreen 104 can define a third sphere (not illustrated) centered at the third point 152 of the touchscreen 104. Ideally, based upon the distance between the first point 140 of the digital pen 106 and the first point 148 of the touchscreen 104, the distance between the first point 140 of the digital pen 106 and the second point 150 of the touchscreen 104, and the distance between the first point 140 of the digital pen 106 and the third point 152 of the touchscreen 104, the first point 140 of the digital pen 106 can be located at a point defined by intersections of the first sphere, the second sphere, and the third sphere. In practice, due to errors in measurements of distances, the intersections of the first sphere, the second sphere, and the third sphere can define a relatively small space and the determination of the location of the first point 140 of the digital pen 106 can be made with respect to this relatively small space.

Preferably, but not necessarily, locations of the first point 148 of the touchscreen 104, the second point 150 of the touchscreen 104, and the third point 152 of the touchscreen 104 can be disposed along edges of the touchscreen 104 in a manner collectively to surround the touchscreen 104. By way of example and not by way of limitation, the first point 148 of the touchscreen 104 can be at or near a first corner 154 of the touchscreen 104, the second point 150 of the touchscreen 104 can be at or near a second corner 156 of the touchscreen 104, and the third point 152 of the touchscreen 104 can be at or near a third corner 158 of the touchscreen 104. Optionally, other distances between the first point 140 of the digital pen 106 and other points of the touchscreen 104 can also be determined. For example, a distance between the first point 140 of the digital pen 106 and a fourth point 160 of the touchscreen 104 can be determined. The fourth point 160 of the touchscreen 104 can be at or near a fourth corner 162 of the touchscreen 104.

By way of example and not by way of limitation, the second circuit 124 can be configured to determine the distance between the first point 140 of the digital pen 106 and the first point 148 of the touchscreen 104, to determine the distance between the first point 140 of the digital pen 106 and the second point 150 of the touchscreen 104, and to determine the distance between the first point 140 of the digital pen 106 and the third point 152 of the touchscreen 104.

By way of another example and not by way of limitation, one of skill in the art understands that a non-transitory computer-readable recording medium can include at least one instruction to perform the operations 224, 226, and 228.

One of skill in the art also understands that the operation 220 (making the determination of the location of the second point 144 of the digital pen 106) can likewise be performed through a series of operations similar to the operations 224, 226, and 228, and so a repeated description of such operations with respect to the operation 220 is omitted.

The digital pen 106 can include, for example, a first at least one of an energy transmitter or an energy receiver/sensor 164 at the first point 140 of the digital pen 106 and a second at least one of an energy transmitter or an energy receiver/sensor 166 at the second point 144 of the digital pen 106. For example, the apparatus 100 can include a first at least one of an energy receiver/sensor or an energy transmitter 168 at the first point 148 of the touchscreen 104, a second at least one of an energy receiver/sensor or an energy transmitter 170 at the second point 150 of the touchscreen 104, and a third at least one of an energy receiver/sensor or an energy transmitter 172 at the third point 152 of the touchscreen 104. Optionally, the apparatus 100 can include other energy receivers/sensors or energy transmitters at other points of the touchscreen 104. For example, the apparatus 100 can include a fourth at least one of an energy receiver/sensor or an energy transmitter 174 at the fourth point 160 of the touchscreen 104. Typically, if the digital pen 106 includes energy transmitters, then the apparatus 100 includes energy receivers/sensors, or vice versa.

Various forms of energy can be used to interact between the energy transmitters and the energy receivers/sensors. For example, the energy transmitters and the energy receivers/sensors can be transducers that transmit mechanical waves (e.g., sound, particularly ultrasound) from the first and the second energy transmitters 164 and 166 to the first, the second, and the third energy receivers/sensors 168, 170, and 172, or from the first, the second, and the third energy transmitters 168, 170, and 172 to the first and the second energy receivers/sensors 164 and 166. For example, the energy transmitters and the energy receivers/sensors can be antennas that transmit electromagnetic waves (e.g., radio waves) from the first and the second energy transmitters 164 and 166 to the first, the second, and the third energy receivers/sensors 168, 170, and 172, or from the first, the second, and the third energy transmitters 168, 170, and 172 to the first and the second energy receivers/sensors 164 and 166. For example, the radio waves can be transmitted and received/sensed using technology that operates in accordance with the Bluetooth® standard. For example, the energy transmitters and the energy receivers/sensors can be optical devices that transmit electromagnetic waves (e.g., light waves) from the first and the second energy transmitters 164 and 166 to the first, the second, and the third energy receivers/sensors 168, 170, and 172, or from the first, the second, and the third energy transmitters 168, 170, and 172 to the first and the second energy receivers/sensors 164 and 166.

Alternatively, the digital pen 106 can include, for example, an accelerometer (not illustrated) that can determine the first angle $\alpha$(or $\beta$) between the first line 112 (or 118) along the edge 114 (or 120) of the touchscreen 104 and the second line 116 along the graphical projection 110, and a relative direction of motion of the digital pen 106 along the touchscreen 104, which can be communicated to the apparatus 100 via a data link (not illustrated). The data link can communicate data in various forms of energy including, but not limited to, sound (e.g., ultrasound) and ultra-high frequency radio waves (e.g., using technology that operates in accordance with the Bluetooth® standard).

Alternatively, the digital pen 106 can include, for example, a magnetometer (not illustrated) or a compass that can determine the first angle $\alpha$(or $\beta$) between the first line 112 (or 118) along the edge 114 (or 120) of the touchscreen 104 and the second line 116 along the graphical projection 110, and an absolute direction of motion of the digital pen 106, which can be communicated to the apparatus 100 via a data link (not illustrated). The data link can communicate data in various forms of energy including, but not limited to, sound (e.g., ultrasound) and ultra-high frequency radio waves (e.g., using technology that operates in accordance with the Bluetooth® standard).

One of skill in the art understands other methods by which the first angle $\alpha$ (or 3) between the first line 112 (or 118) along the edge 114 (or 120) of the touchscreen 104 and the second line 116 along the graphical projection 110 can be determined. Accordingly, aspects are not limited to those described above.

Alternatively, the digital pen 106 (or stylus) can lack the first at least one of the energy transmitter or the energy receiver/sensor 164 and the second at least one of the energy transmitter or the energy receiver/sensor 166 and can be a passive device. In this implementation, the determination of the location of the digital pen 106 (or stylus) can be made by a circuit (not illustrated) within the apparatus 100 that can interact with the at least one of the energy receiver/sensor or the energy transmitter 168, 170, 172, or 174 to determine a shape of a contact area of a tip of the digital pen 106 (or stylus) on the touchscreen 104, to measure an angle of the tip of the digital pen 106 (or stylus) on the touchscreen 104, to measure an amount of pressure exerted by the tip of the digital pen 106 (or stylus) on the touchscreen 104, any combination of the foregoing, or the like.

In an aspect, the operation 224 (determining the distance between the first point 140 of the digital pen 106 and the first point 148 of the touchscreen 104) can include an operation 230. At the operation 230, a time of travel of a mechanical (e.g., sound, particularly ultrasound) wave between the first point 140 of the digital pen 106 and the first point 148 of the touchscreen 104 can be measured. For example, if a speed of the mechanical wave is known, then a product of the time of travel of the mechanical wave between the first point 140 of the digital pen 106 and the first point 148 of the touchscreen 104 multiplied by the speed of the mechanical wave is the distance between the first point 140 of the digital pen 106 and the first point 148 of the touchscreen 104. By way of example and not by way of limitation, the second circuit 124 can be configured to measure the time of travel of a mechanical wave between the first point 140 of the digital pen 106 and the first point 148 of the touchscreen 104. By way of another example and not by way of limitation, one of skill in the art understands that a non-transitory computer-readable recording medium can include at least one instruction to perform the operation 230.

One of skill in the art also understands that each of the operations 226 (determining the distance between the first point 140 of the digital pen 106 and the second point 150 of the touchscreen 104) and 228 (determining the distance between the first point 140 of the digital pen 106 and the third point 152 of the touchscreen 104) can likewise be performed through operations similar to the operation 230, and so a repeated description of such operations with respect to the operations 226 and 228 is omitted.

As described above, the first angle $\alpha$(or $\beta$) can define the location of the hand that holds the digital pen 106. Also as described above, ideally, based upon the distance between the first point 140 of the digital pen 106 and the first point 148 of the touchscreen 104, the distance between the first point 140 of the digital pen 106 and the second point 150 of the touchscreen 104, and the distance between the first point 140 of the digital pen 106 and the third point 152 of the touchscreen 104, the first point 140 of the digital pen 106 can be located at a point defined by intersections of the first sphere, the second sphere, and the third sphere. In practice, due to errors in the measurements of distances, the intersections of the first sphere, the second sphere, and the third sphere can define a relatively small space and the determination of the location of the first point 140 of the digital pen 106 can be made with respect to this relatively small space.

A presence of the hand between at least one of the first or the second energy transmitters or energy receiver/sensors 164 or 166 and at least one of the first, the second, or the third energy receivers/sensors or energy transmitters 168, 170, or 172 can be a cause for errors in the measurements of the distances due to attenuation, distortion, or both of a wave of energy between at least one of the first or the second energy transmitters or energy receiver/sensors 164 or 166 and at least one of the first, the second, or the third energy receivers/sensors or energy transmitters 168, 170, or 172 due to the presence of the hand.

Accordingly, optionally, in an operation 232, which of at least one of the first point 148 of the touchscreen 104, the second point 150 of the touchscreen 104, or the third point 152 of the touchscreen 104 is a point of interest that defines a state in which the location of the hand is between the digital pen 106 and the point of interest can be determined. For example, the location 108 of the graphical projection 110 of the digital pen 106 illustrated in FIG. 1 can suggest that the hand is present between at least one of the first or the second energy transmitters or energy receiver/sensors 164 or 166 and the second energy receiver/sensor or energy transmitter 170 such that the second point 150 of the touchscreen 104 can be a point of interest. Optionally, at an operation 234, the determination of the location of the first point 140 of the digital pen 106 can be adjusted to correct for a distortion of a mechanical wave between the first point 140 of the digital pen 106 and the point of interest (e.g., the second point 150 of the touchscreen 104).

By way of example and not by way of limitation, an optional ninth circuit 176 can be configured to determine which of at least one of the first point 148 of the touchscreen 104, the second point 150 of the touchscreen 104, or the third point 152 of the touchscreen 104 is the point of interest that defines the state in which the location of the hand is between the digital pen 106 and the point of interest. An optional tenth circuit 178 can be configured to adjust the determination of the location of the first point 140 of the digital pen 106 to correct for the distortion of the mechanical wave between the first point 140 of the digital pen 106 and the point of interest (e.g., the second point 150 of the touchscreen 104). The ninth circuit 176 and the tenth circuit 178 are depicted along the side of the apparatus 100 for ease of illustration. One of skill in the art understands that the ninth circuit 176, the tenth circuit 178, or both can be disposed within the apparatus 100. One of skill in the art also understands that at least one of the first circuit 122, the second circuit 124, the third circuit 126, the fourth circuit 128, the fifth circuit 130, the sixth circuit 134, the seventh circuit 136, the eighth circuit 138, the ninth circuit 176, or the tenth circuit 178 can be a common circuit with at least one other of the first circuit 122, the second circuit 124, the third circuit 126, the fourth circuit 128, the fifth circuit 130, the sixth circuit 134, the seventh circuit 136, the eighth circuit 138, the ninth circuit 176, or the tenth circuit 178. For example, such a common circuit can be an electronic processor.

By way of another example and not by way of limitation, one of skill in the art understands that a non-transitory computer-readable recording medium can include at least one instruction to perform the operations 232 and 234.

One of skill in the art also understands that the operations 232 (determining which of at least one of the first point 148 of the touchscreen 104, the second point 150 of the touchscreen 104, or the third point 152 of the touchscreen 104 is a point of interest that defines a state in which the location of the hand is between the digital pen 106 and the point of interest) and 234 (adjusting the determination of the location of the first point 140 of the digital pen 106 to correct for a distortion of a mechanical wave between the first point 140 of the digital pen 106 and the point of interest) can also be performed in conjunction with the operation 220 (making a determination of a location of a second point 144 of the digital pen 106) and so repeated descriptions of the operations 232 and 234 in conjunction with the operation 220 is omitted.

Determining which of at least one of the first point 148 of the touchscreen 104, the second point 150 of the touchscreen 104, or the third point 152 of the touchscreen 104 is a point of interest that defines a state in which the location of the hand is between the digital pen 106 and the point of interest can be accomplished through any of several techniques.

In one technique, a correlation between a reference signal and a signal between one of the first or the second energy transmitters or energy receiver/sensors 164 or 166 and one of the first, the second, or the third energy receivers/sensors or energy transmitters 168, 170, or 172 can be determined. A variance of absolute values of the correlation can be treated as a probability density function. Statistics of the probability density function such as, for example, a maximum value and a median value can be determined. If the statistics are greater than at least one first threshold, then the corresponding one of the first point 148 of the touchscreen 104, the second point 150 of the touchscreen 104, or the third point 152 of the touchscreen 104 can be the point of interest and data associated with this one of the first point 148 of the touchscreen 104, the second point 150 of the touchscreen 104, or the third point 152 of the touchscreen 104 can be excluded from calculations to determine the location of the first point 140 of the digital pen 106. Later, if the statistics are less than a second threshold for a threshold period of time, the data associated with this one of the first point 148 of the touchscreen 104, the second point 150 of the touchscreen 104, or the third point 152 of the touchscreen 104 can be included in calculations to determine the location of the first point 140 of the digital pen 106.

One indication that at least one of the first point 148 of the touchscreen 104, the second point 150 of the touchscreen 104, or the third point 152 of the touchscreen 104 is a point of interest that defines a state in which the location of the hand is between the digital pen 106 and the point of interest can be an abrupt change in the signal between one of the first or the second energy transmitters or energy receiver/sensors 164 or 166 and one of the first, the second, or the third energy receivers/sensors or energy transmitters 168, 170, or 172. However, an abrupt change may not always be a conclusive indication that at least one of the first point 148 of the touchscreen 104, the second point 150 of the touchscreen 104, or the third point 152 of the touchscreen 104 is a point of interest that defines a state in which the location of the hand is between the digital pen 106 and the point of interest.

In another technique, the first, the second, and the third energy receivers/sensors or energy transmitters 168, 170, and 172 can be organized in all the combinations of pairs and all the combinations of triplets. For example, the first, the second, and the third energy receivers/sensors or energy transmitters 168, 170, and 172 can be organized in: (1) a first pair of the first and the second energy receivers/sensors or energy transmitters 168 and 170, (2) a second pair of the first and the third energy receivers/sensors or energy transmitters 168 and 172, (3) a third pair of the second and the third energy receivers/sensors or energy transmitters 170 and 172, and (4) the triplet of the first, the second, and the third energy receivers/sensors or energy transmitters 168, 170, and 172. Calculations to determine the location of the first point 140 of the digital pen 106 can be performed using each of the pairs and the triplet and the results of the calculations can be compared to determine which of at least one of the first point 148 of the touchscreen 104, the second point 150 of the touchscreen 104, or the third point 152 of the touchscreen 104 is a point of interest that defines a state in which the location of the hand is between the digital pen 106 and the point of interest.

In another technique, the method of least squares can be applied to results of the calculations to determine the location of the first point 140 of the digital pen 106 performed on various combinations of the first, the second, and the third energy receivers/sensors or energy transmitters 168, 170, and 172.

One of skill in the art recognizes the advantages and disadvantages of these various techniques. Accordingly, several (or all) of them can be performed and results compared. If a difference between the results of the different techniques is greater than a particular threshold, then a filter can be applied to a combination of the results.

Additionally, one of skill in the art recognizes that these techniques involve iterations of calculations. These iterations can be arranged so that those performed early in the process provide a rudimentary determination of the first angle α (or β). Such a rudimentary determination of the first angle α (or β) can provide a general indication of the location of the hand that holds the digital pen 106. Such a general indication of the location of the hand that holds the digital pen 106 can provide a basic knowledge of which of at least one of the first point 148 of the touchscreen 104, the second point 150 of the touchscreen 104, or the third point 152 of the touchscreen 104 is a point of interest that defines a state in which the location of the hand is between the digital pen 106 and the point of interest. Such a basic knowledge can be incorporated into the process to guide the performance of subsequent iterations so that the calculations can be completed in a shorter period of time than would be consumed in the absence of such basic knowledge.

Referring to FIG. 3, an apparatus 300 is represented as a series of interrelated functional modules. A module 302 for determining a location of a graphical projection of a digital pen onto the touchscreen may correspond at least in some aspects to, for example, a circuit as discussed herein. A module 304 for determining a first angle between a first line along an edge of the touchscreen and a second line along the graphical projection may correspond at least in some aspects to, for example, a circuit as discussed herein. A module 306 for determining a location of the contact with the touchscreen during a training period in which the digital pen is being used to write or draw on the touchscreen may correspond at least in some aspects to, for example, a circuit as discussed herein. A module 308 for using the location of the contact with the touchscreen during the training period to refine the shape may correspond at least in some aspects to, for example, a circuit as discussed herein. A module 310 for determining a distance between the touchscreen and the digital pen may correspond at least in some aspects to, for example, a circuit discussed herein. A module 312 for recognizing a pattern of a touch of the touchscreen may correspond at least in some aspects to, for example, a circuit discussed herein. A module 314 for determining a second angle between the digital pen and a third line perpendicular to the touchscreen and passing through the digital pen may correspond at least in some aspects to, for example, a circuit discussed herein. A module 316 for determining, from the distance, the response to the contact by the hand with the region defined by the location and the first angle may correspond at least in some aspects to, for example, a circuit discussed herein. A module 318 for making a determination of a location of a first point of the digital pen may correspond at least in some aspects to, for example, a circuit discussed herein. A module 320 for to making a determination of a location of a second point of the digital pen may correspond at least in some aspects to, for example, a circuit discussed herein. A module 322 for determining, from the determination of the location of the first point and the determination of the location of the second point, the first angle may correspond at least in some aspects to, for example, a circuit discussed herein. A module 324 for determining a distance between the first point of the digital pen and a first point of the touchscreen may correspond at least in some aspects to, for example, a circuit discussed herein. A module 326 for determining a distance between the first point of the digital pen and a second point of the touchscreen may correspond at least in some aspects to, for example, a circuit discussed herein. A module 328 for determining a distance between the first point of the digital pen and a third point of the touchscreen may correspond at least in some aspects to, for example, a circuit discussed herein. A module 330 for measuring a time of travel of a mechanical wave (e.g., sound, particularly ultrasound) between the first point of the digital pen and the first point of the touchscreen may correspond at least in some aspects to, for example, a circuit discussed herein. A module 332 for determining which of at least one of the first point of the touchscreen, the second point of the touchscreen, or the third point of the touchscreen is a point of interest that defines a state in which the location of the hand is between the digital pen and the point of interest may correspond at least in some aspects to, for example, a circuit discussed herein. A module 334 for adjusting the determination of the location of the first point of the digital pen to correct for a distortion of a mechanical wave between the first point of the digital pen and the point of interest may correspond at least in some aspects to, for example, a circuit discussed herein.

The functionality of the modules of FIG. 3 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it is appreciated by those skilled in the art that a given subset (e.g., of an integrated circuit and/or of a set of software modules) may provide at least a portion of the functionality for more than one module. As one specific example, the apparatus 300 may comprise a single device (e.g., components 302 through 334 comprising different sections of an ASIC). As another specific example, the apparatus 300 may comprise several devices (e.g., the components 318 through 334 comprising one ASIC, and each of the modules 302 and 306 through 316 comprising an ASIC). The functionality of these modules also may be implemented in some other manner as taught herein.

In addition, the components and functions represented by FIG. 3 as well as other components and functions described herein, may be implemented using any suitable means. Such means also may be implemented, at least in part, using corresponding structure as taught herein. For example, the components described above in conjunction with the "module for" components of FIG. 3 also may correspond to similarly designated "means for" functionality. Thus, in some aspects one or more of such means may be implemented using one or more of processor components, integrated circuits, or other suitable structure as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it can provide the functionality; by programming the apparatus or component so that it can provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Those of skill appreciate that any of the various illustrative logical blocks, modules, processors, means, circuits, and algorithm operations described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions are not to be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of operations in any disclosed process is an example of a sample approach. Based upon design preferences, it is understood that the specific order or hierarchy of operations in the processes may be rearranged while remaining within the scope of the present disclosure. The accompanying method claims present elements of the various operations in a sample order, and are not meant to be limited to the specific order or hierarchy presented.

The operations of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising code(s) executable (e.g., executable by at least one computer) to provide functionality relating to one or more of the aspects of the disclosure. In some aspects, a computer program product may comprise packaging materials.

In one or more implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some aspects computer-readable medium may comprise transitory computer readable medium (e.g., comprising a signal). Combinations of the above can also be included within the scope of computer-readable media. It can be appreciated that a computer-readable medium may be implemented in any suitable computer-program product.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

While the foregoing disclosure describes various illustrative aspects, it is noted that various changes and modifications may be made to the illustrated examples without departing from the scope defined by the appended claims. The present disclosure is not intended to be limited to the specifically illustrated examples alone. For example, unless otherwise noted, the functions, operations, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for determining a response to a contact by a hand with a region of a touchscreen, comprising:
    determining a location of a graphical projection of a digital pen onto the touchscreen;
    determining, via an ultrasonic wave, a first angle between a first line along an edge of the touchscreen and a second line along the graphical projection;
    determining a distance between the touchscreen and the digital pen; and
    determining, from the distance, the response to the contact by the hand with the region defined by the location and the first angle.

2. The method of claim 1, wherein the determining the first angle comprises:
    making a determination of a location of a first point of the digital pen;
    making a determination of a location of a second point of the digital pen; and
    determining, from the determination of the location of the first point and the determination of the location of the second point, the first angle.

3. The method of claim 2, wherein the making the determination of the location of the first point of the digital pen comprises:
    determining a distance between the first point of the digital pen and a first point of the touchscreen;
    determining a distance between the first point of the digital pen and a second point of the touchscreen; and
    determining a distance between the first point of the digital pen and a third point of the touchscreen.

4. The method of claim 3, wherein the determining the distance between the first point of the digital pen and the first point of the touchscreen comprises measuring a time of travel of the ultrasonic wave between the first point of the digital pen and the first point of the touchscreen.

5. The method of claim 4, wherein the first angle defines a location of the hand that holds the digital pen.

6. The method of claim 5, further comprising:
    determining which of at least one of the first point of the touchscreen, the second point of the touchscreen, or the third point of the touchscreen is a point of interest that defines a state in which the location of the hand is between the digital pen and the point of interest; and
    adjusting the determination of the location of the first point of the digital pen to correct for a distortion of the ultrasonic wave between the first point of the digital pen and the point of interest.

7. The method of claim 1, wherein the region has a shape that substantially approximates a profile of a portion of the hand that faces the touchscreen when the hand is holding the digital pen to at least one of write or draw on the touchscreen.

8. The method of claim 1, further comprising:
    recognizing a pattern of a touch of the touchscreen; and
    determining a second angle between the digital pen and a third line perpendicular to the touchscreen and passing through the digital pen,
    wherein the determining the response comprises determining, from the distance, the pattern, and the second angle, the response.

9. An apparatus having a touchscreen and configured to determine a response to a contact by a hand with a region of the touchscreen, the apparatus comprising:
    a first circuit configured to determine a location of a graphical projection of a digital pen onto the touchscreen;
    a second circuit configured to determine, via an ultrasonic wave, a first angle between a first line along an edge of the touchscreen and a second line along the graphical projection;
    a third circuit configured to determine a distance between the touchscreen and the digital pen; and
    a fourth circuit configured to determine, from the distance, the response to the contact by the hand with the region defined by the location and the first angle.

10. The apparatus of claim 9, wherein the second circuit is configured to make a determination of a location of a first point of the digital pen, to make a determination of a location of a second point of the digital pen, and to determine, from the determination of the location of the first point and the determination of the location of the second point, the first angle.

11. The apparatus of claim 10, wherein the second circuit is configured to determine a distance between the first point of the digital pen and a first point of the touchscreen, to determine a distance between the first point of the digital pen and a second point of the touchscreen, and to determine a distance between the first point of the digital pen and a third point of the touchscreen.

12. The apparatus of claim 11, further comprising at least one of an energy receiver/sensor or an energy transmitter at the first point of the touchscreen, wherein the second circuit is configured to measure a time of travel of the ultrasonic wave between the first point of the digital pen and the first point of the touchscreen.

13. The apparatus of claim 12, wherein the first angle defines a location of the hand that holds the digital pen, and further comprising:
   a fifth circuit configured to determine which of at least one of the first point of the touchscreen, the second point of the touchscreen, or the third point of the touchscreen is a point of interest that defines a state in which the location of the hand is between the digital pen and the point of interest; and
   a sixth circuit configured to adjust the determination of the location of the first point of the digital pen to correct for a distortion of the ultrasonic wave between the first point of the digital pen and the point of interest.

14. The apparatus of claim 13, wherein at least one of the first circuit, the second circuit, the third circuit, the fourth circuit, the fifth circuit, or the sixth circuit is a common circuit with at least one other of the first circuit, the second circuit, the third circuit, the fourth circuit, the fifth circuit, or the sixth circuit.

15. The apparatus of claim 9, further comprising:
   a fifth circuit configured to recognize a pattern of a touch of the touchscreen; and
   a sixth circuit configured to determine a second angle between the digital pen and a third line perpendicular to the touchscreen and passing through the digital pen,
   wherein the fourth circuit is configured to determine, from the distance, the pattern, and the second angle, the response.

16. A non-transitory computer-readable recording medium for determining a response to a contact by a hand with a region of a touchscreen, comprising:
   at least one instruction to determine a location of a graphical projection of a digital pen onto the touchscreen;
   at least one instruction to determine, via an ultrasonic wave, a first angle between a first line along an edge of the touchscreen and a second line along the graphical projection;
   at least one instruction to determine a distance between the touchscreen and the digital pen; and
   at least one instruction to determine, from the distance, the response to the contact by the hand with the region defined by the location and the first angle.

17. The non-transitory computer-readable recording medium of claim 16, wherein the at least one instruction to determine the response comprises at least one instruction to determine if the distance is greater than a threshold, wherein the response is an action by an apparatus that has the touchscreen in response to the distance being greater than the threshold.

18. The non-transitory computer-readable recording medium of claim 16, wherein the at least one instruction to determine the response comprises at least one instruction to determine if the distance is less than a threshold, wherein the response is a prevention of an action by an apparatus that has the touchscreen in response to the distance being less than the threshold.

19. The non-transitory computer-readable recording medium of claim 16, wherein the at least one instruction to determine the first angle comprises:
   at least one instruction to make a determination of a location of a first point of the digital pen;
   at least one instruction to make a determination of a location of a second point of the digital pen; and
   at least one instruction to determine, from the determination of the location of the first point and the determination of the location of the second point, the first angle.

20. The non-transitory computer-readable recording medium of claim 19, wherein the at least one instruction to make the determination of the location of the first point of the digital pen comprises:
   at least one instruction to determine a distance between the first point of the digital pen and a first point of the touchscreen;
   at least one instruction to determine a distance between the first point of the digital pen and a second point of the touchscreen; and
   at least one instruction to determine a distance between the first point of the digital pen and a third point of the touchscreen.

21. The non-transitory computer-readable recording medium of claim 20, wherein the at least one instruction to determine the distance between the first point of the digital pen and the first point of the touchscreen comprises at least one instruction to measure a time of travel of the ultrasonic wave between the first point of the digital pen and the first point of the touchscreen.

22. The non-transitory computer-readable recording medium of claim 21, wherein the first the first angle defines a location of the hand that holds the digital pen.

23. The non-transitory computer-readable recording medium of claim 22, further comprising:
   at least one instruction to determine which of at least one of the first point of the touchscreen, the second point of the touchscreen, or the third point of the touchscreen is a point of interest that defines a state in which the location of the hand is between the digital pen and the point of interest; and
   at least one instruction to adjust the determination of the location of the first point of the digital pen to correct for a distortion of the ultrasonic wave between the first point of the digital pen and the point of interest.

24. The non-transitory computer-readable recording medium of claim 16, wherein the region has a shape that substantially approximates a profile of a portion of the hand that faces the touchscreen when the hand is holding the digital pen to at least one of write or draw.

25. The non-transitory computer-readable recording medium of claim 24, further comprising:
   at least one instruction to determine a location of the contact with the touchscreen during a training period in which the digital pen is being used to the at least one of write or draw on the touchscreen; and
   at least one instruction to use the location of the contact with the touchscreen during the training period to refine the shape.

26. The non-transitory computer-readable recording medium of claim 16, further comprising:
   at least one instruction to recognize a pattern of a touch of the touchscreen; and
   at least one instruction to determine a second angle between the digital pen and a third line perpendicular to the touchscreen and passing through the digital pen,
   wherein the at least one instruction to determine the response comprises at least one instruction to determine, from the distance, the pattern, and the second angle, the response.

27. The non-transitory computer-readable recording medium of claim 26, wherein the at least one instruction to determine the response comprises at least one instruction to determine if the second angle is greater than a threshold, wherein the response is a prevention of an action by an apparatus that has the touchscreen in response to the second angle being greater than the threshold.

28. An apparatus having a touchscreen and configured to determine a response to a contact by a hand with a region of the touchscreen, comprising:
   means for determining a location of a graphical projection of a digital pen onto the touchscreen;
   means for determining, via an ultrasonic wave, a first angle between a first line along an edge of the touchscreen and a second line along the graphical projection;
   means for determining a distance between the touchscreen and the digital pen; and
   means for determining, from the distance, the response to the contact by the hand with the region defined by the location and the first angle.

29. The apparatus of claim 28, wherein the means for determining the first angle comprises:
   means for making a determination of a location of a first point of the digital pen;
   means for making a determination of a location of a second point of the digital pen; and
   means for determining, from determination of the location of the first point and the determination of the location of the second point, the first angle.

30. The apparatus of claim 29, wherein the means for making the determination of the location of the first point of the digital pen comprises:
   means for determining a distance between the first point of the digital pen and a first point of the touchscreen;
   means for determining a distance between the first point of the digital pen and a second point of the touchscreen; and
   means for determining a distance between the first point of the digital pen and a third point of the touchscreen.

* * * * *